United States Patent
Hernandez et al.

(10) Patent No.: US 7,431,565 B2
(45) Date of Patent: Oct. 7, 2008

(54) METHOD OF REPAIRING A THREADED GENERATOR ROTOR BLOWER ASSEMBLY

(75) Inventors: Gabriel Hernandez, Kansas City, MO (US); Jeffrey Richard Mallat, Mooresville, NC (US)

(73) Assignee: Siemens Power Generation, Inc., Orlando, FL (US)

( * ) Notice: Subject to any disclaimer, the term of this patent is extended or adjusted under 35 U.S.C. 154(b) by 574 days.

(21) Appl. No.: 11/122,569

(22) Filed: May 5, 2005

(65) Prior Publication Data

US 2006/0251521 A1 Nov. 9, 2006

(51) Int. Cl.
*F01D 5/30* (2006.01)

(52) U.S. Cl. ............... 416/219 R; 416/244 A; 416/248

(58) Field of Classification Search ............. 416/219 A, 416/220 A, 248, 219 R
See application file for complete search history.

(56) References Cited

U.S. PATENT DOCUMENTS

| | | | |
|---|---|---|---|
| 3,073,569 A * | 1/1963 | Wagner | 416/204 R |
| 4,043,239 A | 8/1977 | DeFusco | |
| 4,102,036 A | 7/1978 | Salter | |
| 4,165,904 A | 8/1979 | Reppert | |
| 4,275,263 A | 6/1981 | Chino | |
| 4,312,145 A | 1/1982 | Lukavich | |
| 4,730,968 A | 3/1988 | Diperstein et al. | |
| 4,961,687 A | 10/1990 | Bost et al. | |
| 5,073,087 A | 12/1991 | Harrison et al. | |
| 5,152,556 A | 10/1992 | Holland et al. | |
| 5,788,440 A | 8/1998 | Andronica | |
| 6,050,610 A | 4/2000 | Enderle et al. | |
| 6,685,236 B2 | 2/2004 | Setterberg, Jr. | |

FOREIGN PATENT DOCUMENTS

| | | |
|---|---|---|
| DE | 43 32 148 C1 | 2/1995 |
| DE | 4332148 C1 * | 2/1995 |
| GB | 451518 | 8/1936 |
| GB | 880281 | 10/1961 |

* cited by examiner

*Primary Examiner*—Richard Edgar

(57) ABSTRACT

A method of repairing a generator blower hub assembly (12) and rotor blade (10) removed from the generator blower hub assembly (12) where the rotor blade (10) has fatigued material in threads of a threaded blade root (14). The method may include removing (32) at least a portion of the fatigued material to form the blade root (14) to a first or new diameter. Threads may be formed (36) on the diameter of the blade root (14) using a roll forming process. A collar (20) may be secured within a threaded hole (16) formed in the generator blower hub assembly (12) where the collar (20) includes internal threads (35) for receiving the threads formed on the diameter of the blade root (14), which may be threaded into the collar (20). Collar (20) may be fabricated of steel alloy and include relief groove (40) for improving the fatigue resistance of the threaded blade root (14) when reassembled into the generator blower hub assembly (12).

17 Claims, 3 Drawing Sheets

METHOD OF REPAIRING A THREADED GENERATOR ROTOR BLOWER ASSEMBLY

FIELD OF THE INVENTION

This invention relates in general to electrical generators and in particular to a method of repairing a threaded aluminum rotor blower blade connection.

BACKGROUND OF THE INVENTION

Blower blades of a combustion turbine's electrical generator may be connected to rotors in a variety of ways including that described in U.S. Pat. No. 5,073,087. That patent discloses that a plurality of blades may be inserted within a respective plurality of slots formed within radially projecting regions machined within the outer surface of a blower hub. The slots may be formed as dovetails and may be dimensioned so that the length of each slot is only slightly greater than the corresponding dimension of each blade root. The blades may be replaced by unwrapping a band wrapped around a groove adjacent a slot and held in place with adhesive then sliding the defective blade from the slot. A new blade may then be inserted into the slot.

BRIEF SUMMARY OF THE INVENTION

Embodiments of the invention allow for repairing an aluminum blade root and generator blower hub assembly. The root of the blade may be threaded and inserted into a corresponding set of threads formed in the hub. Inspection of threaded aluminum blades has occasionally revealed that cracks have formed near the top threads. This may be attributed to fatigue within the aluminum caused by operating stresses exerted on the blade. Standard maintenance procedures typically require the blades having cracks to be replaced. However, replacing blades is time consuming and costly especially if replacement blades are in short supply, which may cause long outages at a gas turbine power plant.

Embodiments of the invention allow for stripping away fatigued material on an aluminum component and roll forming threads on the component that exhibit an increased fatigue resistance. A threaded sleeve or collar comprising a steel alloy may be provided in combination with the newly formed threads on the aluminum component to further increase fatigue resistance of the threaded connection. A relief groove may be formed within the collar. Embodiments of the invention provide improved fatigue resistance within the blade root during operation of a generator.

DETAILED DESCRIPTION OF THE INVENTION

Aspects of the present invention relate to repair of nonferrous generator rotor blades, which may be fabricated of aluminum, for example. Ferrous materials exhibit a definite fatigue limit whereas nonferrous metals such as aluminum, copper and others do not demonstrate a fatigue limit. In this respect, when a ferrous material, such as a steel alloy component is vibrating below a certain level of stress within an operating environment, it may never break. This is attributable to a fatigue limit exhibited by the steel alloy, i.e., there is a limiting stress level property of the steel alloy below which the steel will never break. On the other hand, nonferrous metals accumulate fatigue stress so that even if such metals are subjected to the smallest stress levels, eventually they will break. These nonferrous materials do not exhibit a fatigue limit.

Figure 1:
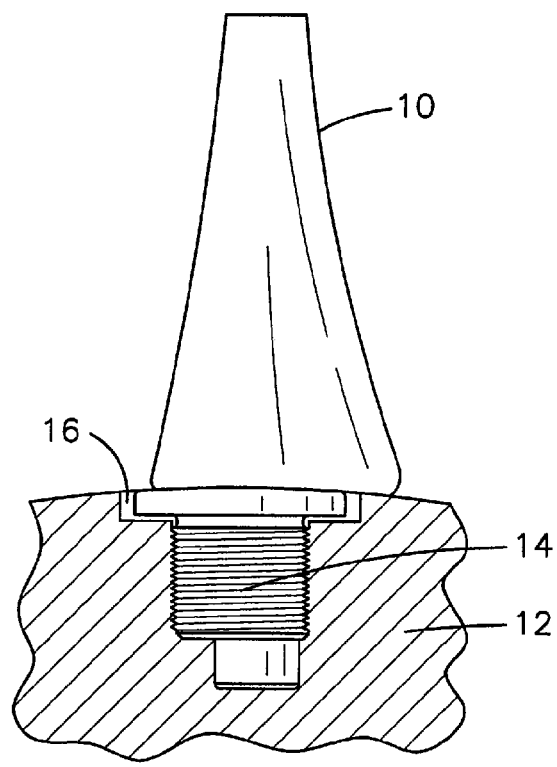
FIG. 1 is a partial view of a prior art rotor blade attached to a blower hub of a generator.
Figure 2:
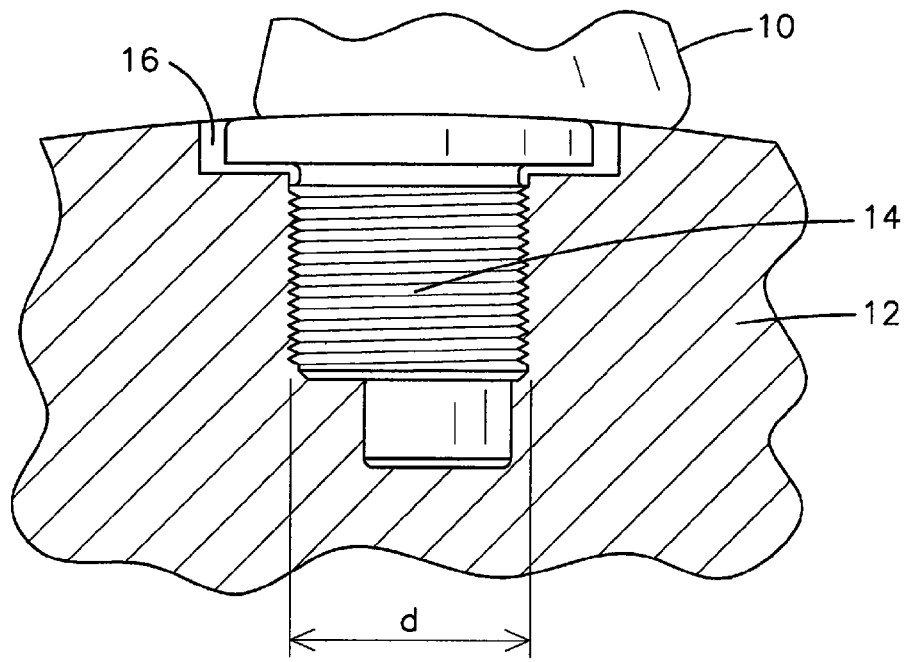
FIG. 2 is a partial view of the prior art rotor blade and blower hub of FIG. 1.

Embodiments of the invention are advantageous in that they reestablish a fatigue limit within an assembly having an aluminum component that has become cracked or contains fatigued material. Such an assembly may include an aluminum blade 10 having an aluminum blade root 14 as shown in FIG. 1. Blade 10 is connected to a steel blower hub 12, which may be a hub of a rotor used with a gas turbine generator (not shown). Such electrical generators are sold by the assignee of the present invention and may be ones that use threaded aluminum blades 10. These generators utilize single-stage blowers, but embodiments of the invention may be used with multi-stage blowers and other apparatus. Blade 10 may be made of aluminum and have an externally threaded blade root 14 threaded to mate with an internally threaded countersunk hole 16 formed within hub 12. A plurality of blades 10 may be circumferentially disposed around hub 12 to form a row of blades as will be recognized by those skilled in the art. FIG. 2 illustrates blade root 14 having a nominal thread diameter "d" when originally threaded into hub 12.

Figure 3:
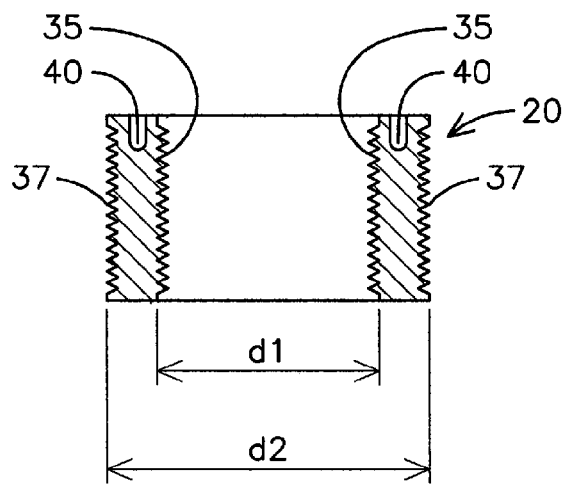
FIG. 3 is a cross sectional view of an exemplary collar for attaching the rotor blade to the blower hub.

FIG. 3 illustrates a cross sectional view of an exemplary attachment or collar 20 that may be used in a method of repairing blade 10, such as when a blade 10 develops cracks in the threads during generator operation. Collar 20 may be fabricated of a steel alloy and formed as a steel sleeve threaded in both the internal "d1" and external "d2" diameters. Fabricating collar 20 of a steel alloy is advantageous because of the fatigue limiting properties exhibited by such alloys. Collar 20 will absorb fatigue loading during operation of a generator. Internally threaded diameter "d1" may be smaller than the original thread diameter "d" of blade root 14 and externally threaded diameter "d2" may be greater than the original thread diameter "d" of blade root 14.

Collar 20 may be fabricated of a steel alloy having a sufficient strength and fatigue limit to hold blade 10 in blower hub 12 after blade root 14 has been repaired and reassembled into hub 12. The strength and fatigue limit of collar 20 may be determined based on the operating specifications of the generator within which collar 20 will be used as well as other design criteria recognized by those skilled in the art. Collar 20 may have a minimum diameter that for which (a) the nominal stresses in the blade root 14 due to centrifugal force of blade 10 during operation do not exceed design requirements and (b) the maximum concentrated stress in the threads of collar 20 does not result in failure due to fatigue in a number of cycles below design requirements.

Figure 5:
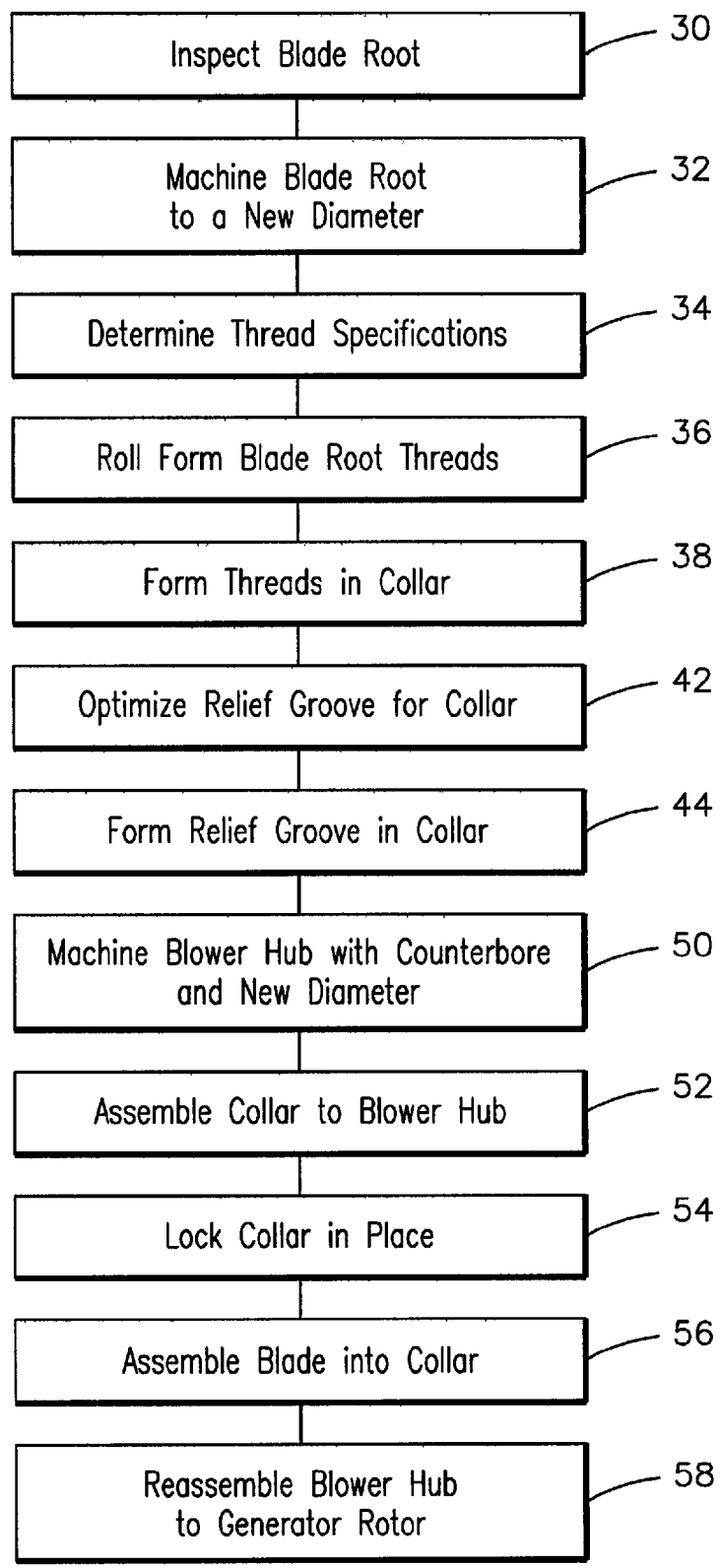
FIG. 5 is a flow diagram of an exemplary method of repairing a generator blower assembly.

FIG. 5 illustrates a flow diagram of an exemplary method of repairing blade 10 and the generator blower hub assembly incorporating blade 10. In step 30, blade 10 may be removed from hub 12 and inspected using known techniques to determine whether an unacceptable amount of cracking has developed in threaded blade root 14. If blade root 14 is to be repaired, step 32 allows for the external diameter "d" of root 14 (FIG. 2) to be machined to eliminate any cracks or material that may be unacceptably fatigued. Blade root 14 may be machined to a new diameter to remove fatigued material. The blade root 14 may be inspected using known techniques to verify that unacceptable cracking is not present after machining.

Electrical generators used in gas turbines may be subjected to different operating conditions and blades 10 may have different design specifications and operating characteristics. This causes varying loads and stresses to be placed on blades 10 used in different generator setups. Thus, the threads used for attaching a blade 10 to a hub 12 may vary from generator-to-generator, and from blade-to-blade within a single generator.

Step 34 allows for determining the thread specifications for a blade root 14 and an associated collar 20, which may be used to determine the new diameter of the blade root 14 machined in step 32. Thread specifications may be determined for externally threading blade root 14, and the internal threads 35 and external threads 37 to be formed on collar 20. These thread specifications may be calculated to improve the fatigue resistance of blade root 14 when assembled into collar 20 and hub 12 relative to the fatigue resistance of the original threads formed on blade root 14. For example, the lead and root diameters, lead and pitch of the threads for blade root 14 and collar 20 may be a function of a generator's operating conditions and a blade's 10 design specifications and performance characteristics.

Blade root 14 may be threaded using known techniques and in an embodiment may be threaded with Acme threads determined in step 34. Blade root 14 may be threaded to a determined thread diameter "d1". Step 36 allows for threads to be formed on blade root 14 by roll forming. Alternate embodiments allow for forming threads by cutting. It has been determined by the inventors of the present invention that roll forming threads on blade root 14 creates threads that are stronger and less prone to fatigue than threads that are formed by cutting. Threads may be roll formed on blade root 14 so that the center cold fusion does not extend deeper than approximately 75% of the basic thread height. Embodiments allow for roll forming threads on blade root 14, which are stronger and more fatigue resistant than cut threads.

Blade root 14 may be machined and threaded to different diameters depending on operating specifications and in an embodiment the major threaded diameter of blade root 14 may be between about 45 mm and 60 mm. Blade root 14 may have a minimum diameter that for which (a) the nominal stresses in the blade root 14 due to centrifugal force of blade 10 during operation do not exceed design requirements and (b) the maximum concentrated stress in the threads of blade root 14 does not result in failure due to fatigue in a number of cycles below design requirements.

The threads determined in step 34 may be formed in collar 20 in step 38. Internal threads 35 may be formed to thread diameter "d1" and external threads 37 to thread diameter "d2". Threads may be formed in collar 20 by roll forming or cutting as appreciated by those skilled in the art.

Figure 4:
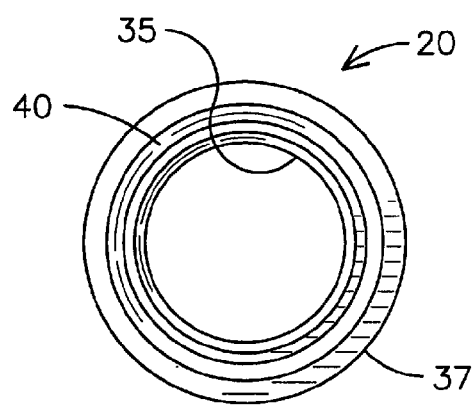
FIG. 4 is plan view of the exemplary collar of FIG. 3.

The inventors have determined that collar 20 may be provided with a geometry calculated to improve the fatigue resistance of blade root 14 when reassembled into hub 12. Such a geometry may include providing a face of collar 20 with a relief groove 40, as shown in FIGS. 3 and 4. Relief groove 40 may be sized to distribute stresses or loads more evenly across all threads formed in collar 20 than in the absence of such a groove. Relief groove 40 may reduce the stresses being concentrated in the top threads of collar 20 during generator operation. This improves fatigue resistance and reduces the risk of cracks being initiated in blade root 14 and/or collar 20 during generator operation. Relief groove 40 may be optimized in step 42 as a function of the thread specifications determined in step 34, the material used for making and dimensions of collar 20 and the performance characteristics of blade 10.

Relief groove 40 may be added to collar 20 in step 44 using known techniques, such as by cutting. Embodiments allow for groove 40 to be formed as a continuous groove around the circumference in a top end of collar 20 as shown in FIG. 4. In alternate embodiments relief groove 40 may be discontinuous to form a plurality of discrete slots or grooves intermittently spaced around the top end of collar 20. One or more relief grooves 40 may be formed directly in hub 12 instead of or in addition to ones formed in collar 20.

Step 50 allows for machining the internal diameter "d" of the existing threaded hole in hub 12 with a counterbore and new diameter "d2" for receipt of collar 20. New diameter "d2" may be threaded with new threads such as the Acme threads determined in step 34. Collar 20 may be assembled with blower hub 14 in step 52 and torqued or preloaded to required design specifications. Preloading collar 20 may be calculated based on the specific material from which collar 20 and hub 12 are fabricated, as well as the expected load produced from centrifugal forces of collar 20 and blade 10 during operation. Collar 20 may be locked in place in step 54 by staking collar 20 in blower hub 14 at two notches formed in collar 20 or in other suitable manners. In alternate embodiments, collar 20 may be threaded back into the original threads formed in hub 12 so that the originally threaded hole would not have to be machined and new threads would not have to be formed therein.

Figure 6:
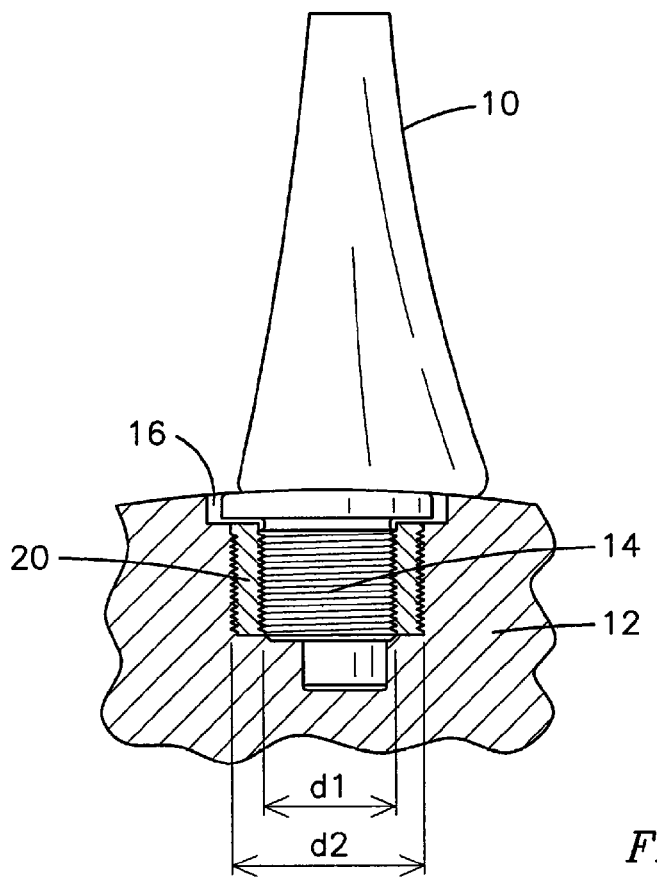
FIG. 6 is a rotor blade secured to a blower hub using the exemplary collar of FIGS. 3 and 4.

Blade 10 may be assembled with collar 20 in step 56 by turning blade 10 into collar 20 via their respective threads until reaching the original specification of blade tip diameter and airfoil angle. In an embodiment, the threads formed on blade root 14 are not preloaded when blade 10 is threaded into collar 20. The threads 35, 37 of collar 20 may be covered with LOCTITE brand adhesive or other conventional substances to increase friction and minimize motion of blade 10 relative to collar 20 and hub 12. FIG. 6 illustrates a blade 10 assembled with collar 20 in hub 12. After completing assembly of all blades 10 to hub 12 via respective collars 20, the hub 12 is reassembled to the generator rotor (not shown). The generator rotor is then balanced to account for any changes in weight attributed to the repair process such as weight being added by virtue of one or more collars 20 be assembled to hub 12.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

We claim:

1. A method of repairing a rotor blade removed from a generator hub, the rotor blade having fatigued material in a thread of a threaded blade root, the method comprising:
   removing at least a portion of the fatigued material to form the blade root to a first diameter;
   forming a thread on the first diameter of the blade root;
   securing a collar within a hole formed in the generator hub, the collar comprising an internal thread for receiving the thread formed on the first diameter of the blade root; and
   threading the blade root of the rotor blade into the collar.

2. The method of claim 1 further comprising:
machining the hole formed in the generator hub to a second diameter;
machining a thread on the second diameter;
forming an external thread on the collar; and
securing the collar within the hole formed in the generator hub by threading the collar into the hole.

3. The method of claim 1 further comprising:
forming a thread on the first diameter calculated to produce a fatigue resistance greater than a fatigue resistance produced by a thread of the threaded blade root removed from the generator hub.

4. The method of claim 3 further comprising:
roll forming a thread on the first diameter so that a center cold fusion portion of a majority of the roll formed thread does not extend deeper than approximately 75% of a height of the respective roll formed thread.

5. The method of claim 1 further comprising:
cutting a relief groove in a face of the collar.

6. The method of claim 1 further comprising:
forming a thread on the first diameter calculated to produce a fatigue resistance greater than a fatigue resistance produced by a thread of the threaded blade root removed from the generator hub;
providing the collar comprising a steel alloy;
forming an external thread on the collar;
forming an internal thread on the collar; and
securing the collar within the hole formed in the generator hub by threading the collar into an internal within the hole.

7. The method of claim 1 further comprising:
providing the collar made of a steel alloy; and
the thread formed on the first diameter of the blade root comprising aluminum.

8. The method of claim 7 further comprising:
providing the collar having a relief groove cut in a face of the collar.

9. The method of claim 1 further comprising:
roll forming a thread on the first diameter.

10. A method of repairing a generator blower hub assembly of a generator, the method comprising:
disassembling the generator blower hub assembly from a generator rotor;
removing at least one rotor blade from a threaded hole in the generator blower hub assembly, the at least one rotor blade comprising a root threaded to an original diameter;
machining the root of the at least one rotor blade to a new diameter to removed fatigued material;
forming a new thread on the new diameter of the root of the at least one rotor blade removed from the generator blower hub assembly;
threading a collar into the threaded hole in the generator blower hub assembly; and
replacing the at least one rotor blade removed from the generator blower hub assembly by threading the newly formed thread on the root of the at least one rotor blade into an internal thread formed in the collar.

11. The method of claim 10 further comprising:
forming the new thread on the new diameter of the root of the at least one rotor blade calculated to have a fatigue resistance that is greater than a fatigue resistance of the root threaded to an original diameter.

12. The method of claim 10 further comprising:
machining the threaded hole in the generator hub to a second diameter;
cutting a new thread within the threaded hole in the generator hub; and
forming an external thread on the collar for threading the collar into the new thread within the threaded hole.

13. The method of claim 12 further comprising:
reassembling the generator blower hub assembly to the generator rotor; and
balancing the generator rotor.

14. The method of claim 10 further comprising:
providing the collar comprising a steel alloy; and
providing the collar with a geometry calculated to improve a fatigue resistance of the root of the at least one rotor blade removed from the generator blower hub assembly when reassembled into the generator blower hub assembly.

15. The method of claim 14 further comprising:
the geometry comprising a relief groove formed in the collar.

16. The method of claim 10 further comprising:
roll forming the new thread on the new diameter of the root of the at least one rotor blade.

17. The method of claim 10 further comprising:
cutting a relief groove in a face of the collar.

* * * * *